(12) United States Patent
Ning

(10) Patent No.: US 11,383,776 B2
(45) Date of Patent: Jul. 12, 2022

(54) UNMANNED VEHICLE CHASSIS AND UNMANNED VEHICLE

(71) Applicant: Beijing Sankuai Online Technology Co., Ltd, Beijing (CN)

(72) Inventor: Kejun Ning, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 143 days.

(21) Appl. No.: 16/961,254

(22) PCT Filed: Dec. 12, 2018

(86) PCT No.: PCT/CN2018/120688
§ 371 (c)(1),
(2) Date: Jul. 10, 2020

(87) PCT Pub. No.: WO2019/137140
PCT Pub. Date: Jul. 18, 2019

(65) Prior Publication Data
US 2021/0061382 A1 Mar. 4, 2021

(30) Foreign Application Priority Data
Jan. 12, 2018 (CN) .......................... 201810031881.1

(51) Int. Cl.
*B62D 61/10* (2006.01)
*B60K 1/02* (2006.01)
(Continued)

(52) U.S. Cl.
CPC ............... *B62D 61/10* (2013.01); *B60K 1/02* (2013.01); *B60K 17/04* (2013.01); *B60K 17/22* (2013.01)

(58) Field of Classification Search
CPC . B62D 61/10; B60K 1/00; B60K 1/02; B60K 17/04; B60K 17/22; B60K 17/342; B60K 17/354; B60K 17/356
See application file for complete search history.

(56) References Cited

U.S. PATENT DOCUMENTS 3,161,172 A    12/1964  Kassbohrer
3,351,037 A *  11/1967  Meili ................... B62D 53/005
                                                  180/41
(Continued)

FOREIGN PATENT DOCUMENTS

CN    101890986 A    11/2010
CN    202038160 U    11/2011
(Continued)

OTHER PUBLICATIONS

Canada Patent Office, Office Action Issued in Application No. 3087907, dated Oct. 14, 2021, 4 pages.
(Continued)

*Primary Examiner* — James A English
(74) *Attorney, Agent, or Firm* — Kilpatrick Townsend & Stockton LLP

(57) ABSTRACT

An unmanned vehicle chassis includes: a chassis bracket, a front wheel assembly, a middle wheel assembly, and a rear wheel assembly that engage the chassis bracket, a driving unit disposed on the chassis bracket and configured to drive the unmanned vehicle chassis to move, a rocker arm connected to the chassis bracket, where the rocker arm rotates around an axis of the middle wheel assembly, and the middle wheel assembly and the rear wheel assembly are mounted at both ends of the rocker arm, respectively, and connected to the chassis bracket through the rocker arm, and a driving mechanism disposed on the chassis bracket and configured to control the rocker arm to move.

15 Claims, 3 Drawing Sheets

(51) Int. Cl.
*B60K 17/04* (2006.01)
*B60K 17/22* (2006.01)

(56) References Cited

U.S. PATENT DOCUMENTS

| | | | |
|---|---|---|---|
| 2017/0080846 A1* | 3/2017 | Lord | B60K 7/00 |
| 2018/0229572 A1* | 8/2018 | Liivik | B62D 61/10 |
| 2020/0269676 A1* | 8/2020 | Lord | B60K 17/00 |
| 2021/0114430 A1* | 4/2021 | Mei | B62D 61/10 |

FOREIGN PATENT DOCUMENTS

| | | | | |
|---|---|---|---|---|
| CN | 102303655 A | 1/2012 | | |
| CN | 203460696 U | 3/2014 | | |
| CN | 106275115 A | 1/2017 | | |
| CN | 108100076 A | 6/2018 | | |
| CN | 208181246 U | 12/2018 | | |
| JP | 2000190882 A | * | 7/2000 | B62D 61/10 |
| WO | 2017076813 A1 | 5/2017 | | |

OTHER PUBLICATIONS

ISA State Intellectual Property Office of the People's Republic of China, Written Opinion of the International Searching Authority Issued in Application No. PCT/CN2018/120688, dated Feb. 27, 2019, WIPO, 11 pages.

ISA State Intellectual Property Office of the People's Republic of China, International Search Report issued in Application No. PCT/CN2018/120688, dated Feb. 27, 2019, WIPO, 6 pages.

* cited by examiner

UNMANNED VEHICLE CHASSIS AND UNMANNED VEHICLE

CROSS REFERENCE TO RELATED APPLICATIONS

This application is a National Stage of International Application No. PCT/CN2018/120688 filed on Dec. 12, 2018 which claims priority to Chinese Patent Application No. 201810031881.1, filed on Jan. 12, 2018, and entitled "UNMANNED VEHICLE CHASSIS AND UNMANNED VEHICLE", both of which are incorporated herein by reference in their entireties.

FIELD

This application relates to an unmanned vehicle chassis and an unmanned vehicle.

BACKGROUND

When wheels of a wheeled unmanned vehicle are horizontally and symmetrically disposed relative to a vehicle body, the unmanned vehicle may be equipped with a buffer or a suspension mechanism to realize stable running on uneven roads.

SUMMARY

According to a first aspect of embodiments of this application, an unmanned vehicle chassis is provided.

An unmanned vehicle chassis, including: a chassis bracket; a front wheel assembly, a middle wheel assembly, and a rear wheel assembly that engage the chassis bracket; a driving unit disposed on the chassis bracket and configured to drive the unmanned vehicle chassis to move; a rocker arm connected to the chassis bracket, where the rocker arm rotates around an axis of the middle wheel assembly, and the middle wheel assembly and the rear wheel assembly are mounted at both ends of the rocker arm, respectively, and connected to the chassis bracket through the rocker arm; and a driving mechanism disposed on the chassis bracket and configured to control the rocker arm to move.

Further, the rocker arm includes: a body; and a rotating shaft disposed at a first end of the body, where the rotating shaft is positioned on a rocker arm bearing seat of the chassis bracket through a bearing. The rotating shaft includes a hollow rotating shaft.

Further, the front wheel assembly includes: a left front wheel; a right front wheel; a first transmission shaft engaging the left front wheel; and a second transmission shaft engaging the right front wheel.

Further, the driving unit includes: a first motor configured to drive the left front wheel; and a second motor configured to drive the right front wheel.

Further, the middle wheel assembly includes: a left middle wheel; a right middle wheel; a third transmission shaft engaging the left middle wheel; and a fourth transmission shaft engaging the right middle wheel, where the third transmission shaft and the fourth transmission shaft are nested in the rotating shaft.

Further, the third transmission shaft and the fourth transmission shaft are both positioned in the rotating shaft of the rocker arm through a duplex bearing.

Further, the unmanned vehicle chassis includes: a third motor disposed on the chassis bracket and configured to drive the third transmission shaft, where the third motor includes a first speed reducer; and a fourth motor disposed on the chassis bracket and configured to drive the fourth transmission shaft, where the fourth motor includes a second speed reducer.

Further, the rear wheel assembly includes: a left rear wheel; a right rear wheel; a fifth transmission shaft engaging the left rear wheel; and a sixth transmission shaft engaging the right rear wheel, where the fifth transmission shaft and the sixth transmission shaft are assembled at a second end of the body opposite to the rotating shaft.

Further, the unmanned vehicle chassis further includes: a transmission chain or a timing belt disposed on the rocker arm, the transmission chain or the timing belt being configured to cause the left middle wheel, the right middle wheel, the left rear wheel, and the right rear wheel to rotate synchronously.

Further, the driving mechanism includes: a driving motor; a first gear set driven by the driving motor.

Further, the unmanned vehicle chassis further includes: a second gear set linked with the first gear set, where the second gear set is disposed at an end of the rotating shaft close to a center of the unmanned vehicle chassis, and the second gear set is configured to drive the rocker arm to rotate around an axis of the middle wheel assembly.

Further, the rocker arm includes: a first rocker arm connecting the left middle wheel and the left rear wheel; and a second rocker arm connecting the right middle wheel and the right rear wheel, where the driving motor is configured to drive the first rocker arm and the second rocker arm to move synchronously.

Further, the front wheel assembly includes an omnidirectional wheel.

According to a second aspect of embodiments of this application, an unmanned vehicle is provided. The unmanned vehicle includes a vehicle body; and the foregoing unmanned vehicle chassis.

In this application, the middle wheel assembly and the rear wheel assembly on the unmanned vehicle chassis may be connected through a rotatable rocker arm, so that the rotating shaft of the rocker arm is coaxial with the axis of the middle wheel assembly. In this way, when the unmanned vehicle is in a high-mobility operating mode, only the driving motor (70) is required to provide a relatively small output torque to maintain a system posture of the rocker arm, greatly reducing the power requirements of an unmanned vehicle motion system.

REFERENCE NUMERALS

Figure 1:
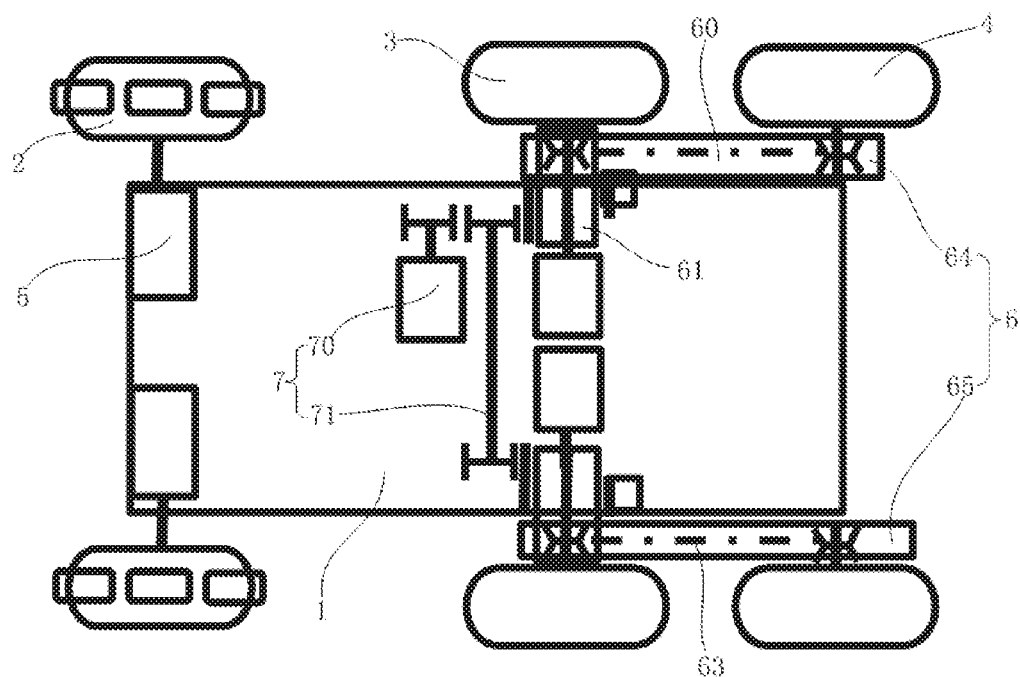
FIG. 1 is a simplified schematic diagram of an unmanned vehicle chassis according to an exemplary embodiment of this application.
Figure 2:
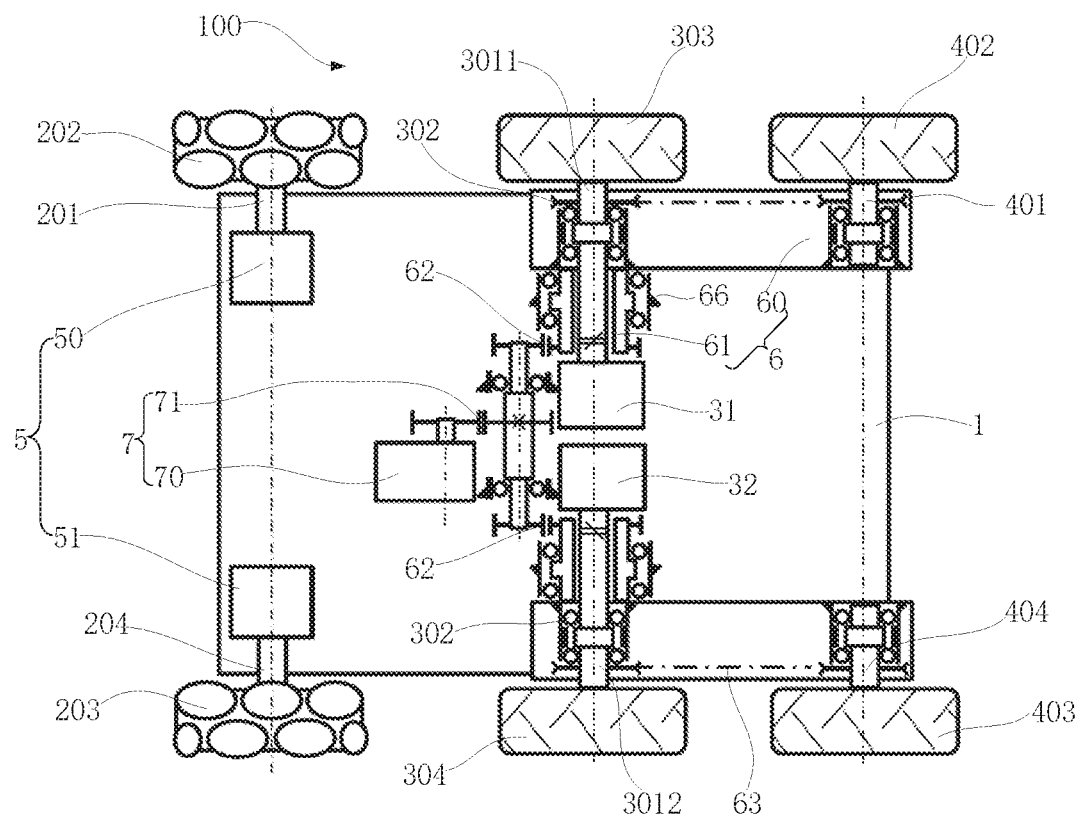
FIG. 2 is a detailed schematic diagram of an unmanned vehicle chassis according to an exemplary embodiment of this application.

Unmanned vehicle chassis 100;
Chassis bracket 1;
Front wheel assembly 2; Front wheel 20; First rotating shaft 201; Left front wheel 202; Right front wheel 203; Second rotating shaft 204;
Middle wheel assembly 3; Middle wheel 30; Third rotating shaft 3011; Fourth rotating shaft 3012; Bearing 302; Left middle wheel 303; Right middle wheel 304; Third motor 31; Fourth motor 32;
Rear wheel assembly 4; Rear wheel 40; Fifth rotating shaft 401; Left rear wheel 402; Right rear wheel 403; Driving unit 5; First motor 50; Second motor 51; Sixth rotating shaft 404;
Rocker arm 6; Body 60; Rotating shaft 61; First rocker arm 64; Second rocker arm 65;
 Second gear set 62;
 Transmission chain 63;
 Driving mechanism 7;
 Driving motor 70;
 First gear set 71.

DETAILED DESCRIPTION OF THE EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this application. On the contrary, the implementations are merely examples of apparatuses and methods that are described in detail in the appended claims and that are consistent with some aspects of this application.

The terms used in this application are merely for the purpose of describing specific embodiments, and are not intended to limit this application. The terms "a", "said", and "the" of singular forms used in this application and the appended claims are also intended to include plural forms, unless otherwise specified in the context clearly.

It is to be understood that, "first", "second" and similar terms used in the specification and the claims of this patent application do not indicate any sequence, quantity, or importance, but are only used to distinguish different components. Similarly, "one", "a", and similar terms also do not indicate a quantity limitation, but indicates that there is at least one. Unless otherwise stated, the terms such as "front", "rear", "lower", and/or "upper" are for ease of description only and are not limited to a position or a spatial orientation. The terms such as "comprise", "include", or any variant thereof mean that an element or article preceded by "comprise" or "include" encompasses elements or articles and their equivalents listed after "comprise" or "include", do not exclude the existence of other elements or articles. "A plurality of" as used in this application includes two or more.

When a wheeled unmanned vehicle encounters an obstacle, a chassis of the wheeled unmanned vehicle may not be able to successfully cross the obstacle. Since the unmanned vehicle is landing on a plurality of wheels, there may be a relatively large drag friction side shift of front and rear side wheels when the in-situ rotation is achieved through the difference between the left and right side wheels, and the power consumption is relatively high. The multi-wheel articulated chassis with high obstacle-crossing capability requires a driving motor to continuously provide output to keep the vehicle body lifted, which requires higher power output performance. In order to improve the obstacle-crossing performance of the unmanned vehicle, the chassis of the unmanned vehicle may be modified to reduce energy consumption while satisfying the rotation and obstacle-crossing functions.

Exemplary embodiments of this application are described in detail below with reference to accompanying drawings. Without conflict, the following embodiments and features in the embodiments can be combined with each other.

Referring to FIG. 1 to FIG. 5, an unmanned vehicle includes a vehicle body and an unmanned vehicle chassis 100. The unmanned vehicle chassis includes: a chassis bracket 1; a front wheel assembly 2, a middle wheel assembly 3, and a rear wheel assembly 4 that engage the chassis bracket 1; a driving unit 5 configured to drive the unmanned vehicle chassis 1 to move; a rocker arm 6 connected to the chassis bracket 1; and a driving mechanism 7 configured to control the rocker arm 6 to move. The middle wheel assembly 3 and the rear wheel assembly 4 are mounted on the rocker arm 6 and connected to the chassis bracket 1 through the rocker arm 6. The rocker arm 6 rotates around the axis of the middle wheel assembly 3, and the front wheel assembly 2 is an omnidirectional wheel.

The front wheel assembly 2 includes a front wheel 20 and transmission shafts 201 and 204 engaging the front wheel 20. The front wheel 20 includes a left front wheel 202 and a right front wheel 203. The driving unit 5 includes a first motor 50 for driving the left front wheel 202 and a second motor 51 for driving the right front wheel 203. In the embodiments of this application, the omnidirectional wheels used in the front wheel assembly 2 may be single-row omnidirectional wheels or double-row omnidirectional wheels. The double-row omnidirectional wheel has smaller vibration magnitude than the single-row omnidirectional wheel during the travelling of the unmanned vehicle or during obstacle crossing. In this application, the omnidirectional wheel is used as the front wheel 20 and performs side shift movement, so that the unmanned vehicle can swerve more conveniently.

In an embodiment, the rocker arm 6 includes a body 60 and a rotating shaft 61 disposed at an end of the body 60. The body 60 is generally a plate-like structure, and the rotating shaft 61 extends horizontally from an inner side of the body 60. In this embodiment, the rotating shaft 61 is a hollow cylindrical rotating shaft. The rotating shaft 61 is positioned on a rocker arm bearing seat 66 of the chassis bracket 1 through a bearing, to mount the rocker arm 6 onto the chassis bracket 1. The driving mechanism 7 drives the rocker arm 6 to rotate around the axis of the middle wheel assembly 3. The middle wheel assembly 3 includes a middle wheel 30 and transmission shafts 3011 and 3012 engaging the middle wheel 30. The transmission shafts 3011 and 3012 are nested or enclosed in the rotating shaft 61. In one embodiment, the transmission shafts 3011 and 3012 are both positioned in the rotating shaft 61 of the rocker arm 6 through a duplex bearing 302, to ensure the coaxial movement of the rocker arm 6 and the middle wheel 30 and reduce the power requirements of the unmanned vehicle motion system.

The middle wheel 30 includes a left middle wheel 303 and a right middle wheel 304. The chassis bracket 1 is provided with a third motor 31 for driving a third transmission shaft 3011 and a fourth motor 32 for driving a fourth transmission shaft 3012, respectively. The third motor 31 and the fourth motor 32 are both provided with reducers inside. The third motor (31) is disposed on the chassis bracket (1). The fourth motor (32) is disposed on the chassis bracket (1).

The rear wheel assembly 4 includes a rear wheel 40 and transmission shafts 401 and 404 engaging the rear wheel 40. The fifth transmission shaft (401) and the sixth transmission shaft (404) are assembled on the other end of the body 60 away from the rotating shaft 61, respectively, and the rear wheel 40 and the middle wheel 30 on the same side are assembled onto the same rocker arm 6.

The rocker arm 6 is provided with a transmission chain 63 or a timing belt that synchronously drives the middle wheel 30 and the rear wheel 40 to rotate. The transmission chain 63 or the timing belt is configured to cause the middle wheel 30 and the rear wheel 40 to rotate synchronously. Through the structural configuration, the middle wheel 30 and the rear wheel 40 can implement drive sharing and synchronization through the transmission chain 63 or the timing belt. In this application, the rotating shaft 61 of the rocker arm 6 is coaxial with the axis of the middle wheel 30 through a fixed shaft of the middle wheel 30, and the middle wheel 30 and the rear wheel 40 are driven through the same link, so that the overall structure is simpler.

The rear wheel 40 includes a left rear wheel 402 and a right rear wheel 403, and the rocker arm 6 includes a first rocker arm 64 that connects the left middle wheel 303 and the left rear wheel 402 and a second rocker arm 65 that connects the right middle wheel 304 and the right rear wheel 403.

The driving mechanism 7 includes a driving motor 70 and a first gear set 71 driven by the driving motor 70. A second gear set 62 linked to the first gear set 71 is provided at the end of the rotating shaft 61 close to the center of the unmanned vehicle chassis, that is, at a position close to the first gear set 71. The second gear set 62 is used to drive the rocker arm 6 to rotate around the axis of the middle wheel assembly 3 to synchronously transmit the power of the driving mechanism 7 to the first rocker arm 64 and the second rocker arm 65, so as to ensure that the driving motor drives the first rocker arm 64 and the second rocker arm 65 to move synchronously.

In this embodiment, the left and right middle wheels and the left and right rear wheels are ordinary tires.

Figure 3:
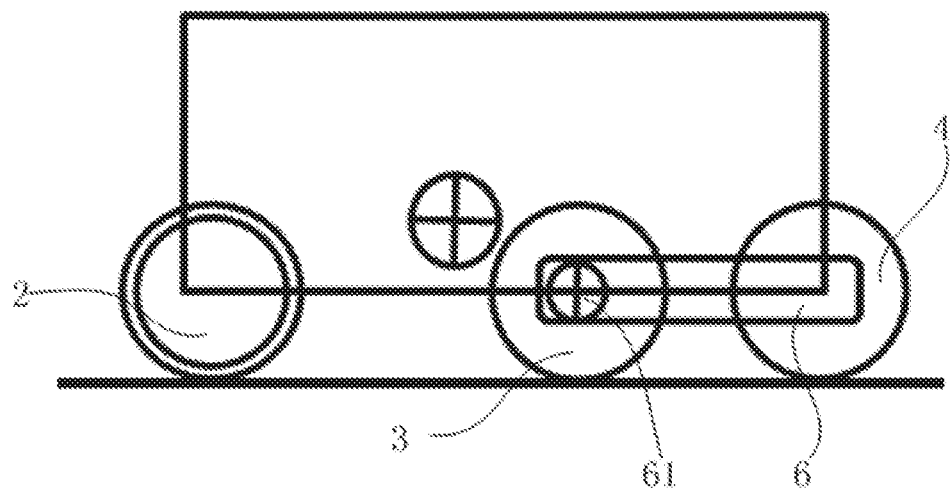
FIG. 3 is a schematic diagram of an unmanned vehicle during normal driving according to an exemplary embodiment of this application.
Figure 4:
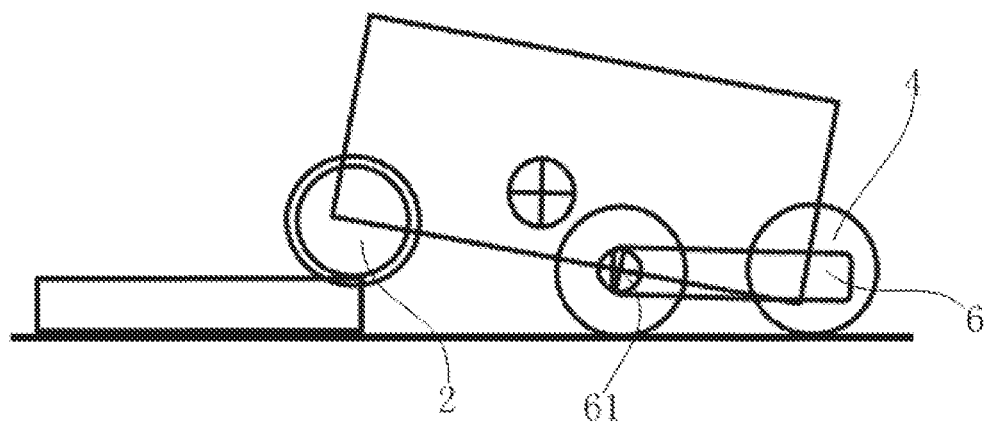
FIG. 4 is a schematic diagram of an unmanned vehicle crossing a first position according to an exemplary embodiment of this application.
Figure 5:
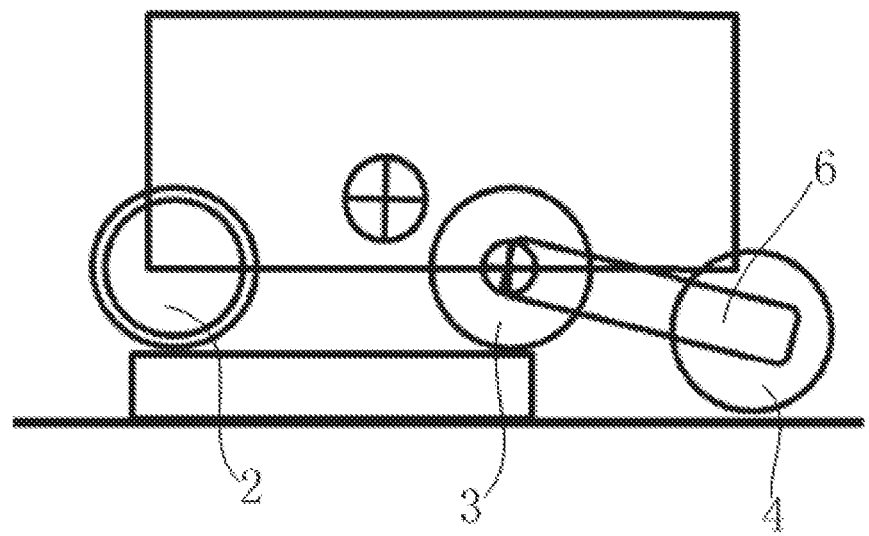
FIG. 5 is a schematic diagram of an unmanned vehicle crossing a second position according to an exemplary embodiment of this application.

FIG. 3 is a schematic diagram of a driving state of an unmanned vehicle under normal road conditions, and FIG. 4 and FIG. 5 are schematic diagrams of an unmanned vehicle during obstacle crossing. The mark 0 on the body of the unmanned vehicle shown in the figure is the center of gravity of the unmanned vehicle.

Figure 6:
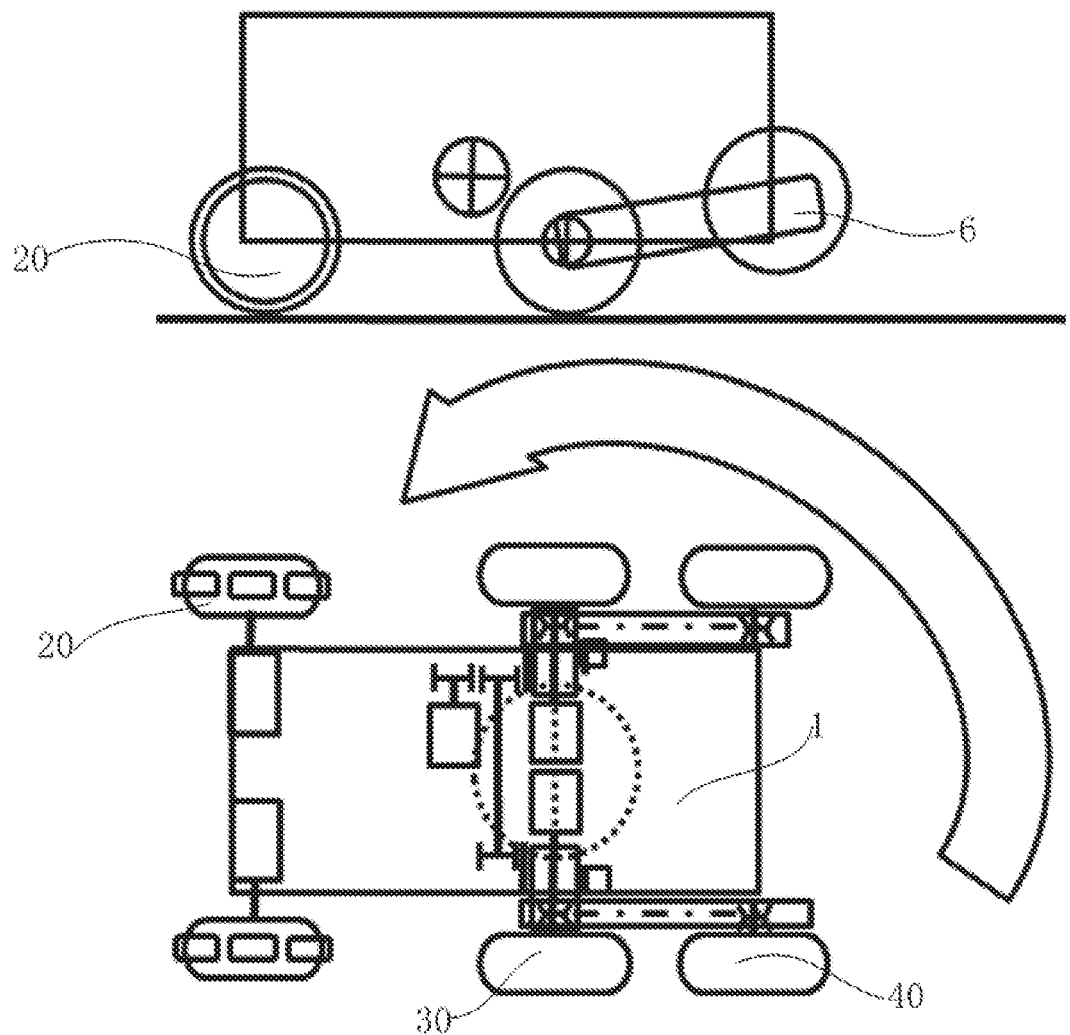
FIG. 6 is a schematic diagram of an unmanned vehicle crossing a third position according to an exemplary embodiment of this application.

As shown in FIG. 6, after the driving mechanism 7 drives the rocker arm 6 to lift the rear wheels, the left and right front wheels 202 and 203 and the left and right middle wheels 303 and 304 land on the ground. Since the front wheels are omnidirectional wheels that can perform side shift movement, the left and right front wheels 202 and 203 and the left and right middle wheels 303 and 304 essentially degenerate into differential wheels, and the center of rotation of the whole machine (the turning effect of the whole machine is to turn the unmanned vehicle) falls onto the axis of the middle wheel, such as the axis shown in the dashed circle in FIG. 6. Since the center of rotation of the rocker arm 6 (the rotation effect of the rocker arm is to swing the rear wheel up and down) is on the axis of the middle wheel, the rear wheel up mode only requires the driving motor 70 of the rocker arm 6 to provide a relatively small output torque, so that the system posture of the rocker arm 6 is maintained. In this way, the power requirements for the unmanned vehicle system can be reduced.

During the obstacle crossing of the unmanned vehicle provided in this application, the rear wheels are slightly off the ground, that is, the rear wheels basically have no pressure on the ground, and in this case, meaningless loss and friction will not be generated.

The first motor 50 and the second motor 51 may also be directly replaced with bearings to realize an unpowered shaft. In this case, the chassis 100 is differentially driven by the third motor 31 and the fourth motor 32, which is easier to control.

The above descriptions are merely exemplary embodiments of this application, and are not intended to limit this application in any form. Although this application has been disclosed above through the exemplary embodiments, the embodiments are not intended to limit this application. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

The invention claimed is:

1. An unmanned vehicle chassis, comprising:
   a chassis bracket;
   a front wheel assembly, a middle wheel assembly, and a rear wheel assembly that engage the chassis bracket, wherein the middle wheel assembly comprises a left middle wheel, a right middle wheel, a third transmission shaft engaging the left middle wheel, and a fourth transmission shaft engaging the right middle wheel;
   a driving unit disposed on the chassis bracket and configured to drive the unmanned vehicle chassis to move;
   a rocker arm connected to the chassis bracket, wherein the rocker arm rotates around an axis of the middle wheel assembly, and the middle wheel assembly and the rear wheel assembly are mounted at both ends of the rocker arm, respectively, and connected to the chassis bracket through the rocker arm, the rocker arm comprises a body with a plate-like structure and a rotating shaft generated by extending horizontally from an inner side of the body, the rotating shaft being positioned on a rocker arm bearing seat of the chassis bracket through a bearing, and the third transmission shaft and the fourth transmission shaft being respectively positioned within the rotating shaft of the rocker arm through a respective duplex bearing; and
   a driving mechanism disposed on the chassis bracket and configured to control the rocker arm to move.

2. The unmanned vehicle chassis according to claim 1, wherein the rotating shaft comprises a hollow rotating shaft.

3. The unmanned vehicle chassis according to claim 1, wherein the front wheel assembly comprises:
   a left front wheel;
   a right front wheel;
   a first transmission shaft engaging the left front wheel; and
   a second transmission shaft engaging the right front wheel.

4. The unmanned vehicle chassis according to claim 3, wherein the driving unit comprises:
 a first motor configured to drive the left front wheel; and
 a second motor configured to drive the right front wheel.

5. The unmanned vehicle chassis according to claim 1, comprising:
 a third motor disposed on the chassis bracket and configured to drive the third transmission shaft, wherein the third motor comprises a first speed reducer; and
 a fourth motor disposed on the chassis bracket and configured to drive the fourth transmission shaft, wherein the fourth motor comprises a second speed reducer.

6. The unmanned vehicle chassis according to claim 1, wherein the rear wheel assembly comprises:
 a left rear wheel;
 a right rear wheel;
 a fifth transmission shaft engaging the left rear wheel; and
 a sixth transmission shaft engaging the right rear wheel, wherein
 the fifth transmission shaft and the sixth transmission shaft are assembled at a second end of the body opposite to the rotating shaft.

7. The unmanned vehicle chassis according to claim 6, further comprising:
 a transmission chain or a timing belt disposed on the rocker arm, the transmission chain or the timing belt being configured to cause the left middle wheel, the right middle wheel, the left rear wheel, and the right rear wheel to rotate synchronously.

8. The unmanned vehicle chassis according to claim 1, wherein the driving mechanism comprises:
 a driving motor; and
 a first gear set driven by the driving motor.

9. The unmanned vehicle chassis according to claim 8, further comprising:
 a second gear set linked with the first gear set, wherein the second gear set is disposed at an end of the rotating shaft close to a center of the unmanned vehicle chassis, and the second gear set is configured to drive the rocker arm to rotate around an axis of the middle wheel assembly.

10. The unmanned vehicle chassis according to claim 8, wherein the rocker arm comprises:
 a first rocker arm connecting the left middle wheel and the left rear wheel; and
 a second rocker arm connecting the right middle wheel and the right rear wheel, wherein
 the driving motor is configured to drive the first rocker arm and the second rocker arm to move synchronously.

11. The unmanned vehicle chassis according to claim 1, wherein the front wheel assembly comprises an omnidirectional wheel.

12. An unmanned vehicle, comprising:
 a vehicle body; and
 an unmanned vehicle chassis, wherein the unmanned vehicle chassis comprises:
 a chassis bracket;
 a front wheel assembly, a middle wheel assembly, and a rear wheel assembly that engage the chassis bracket, wherein the middle wheel assembly comprises a left middle wheel, a right middle wheel, a third transmission shaft engaging the left middle wheel, and a fourth transmission shaft engaging the right middle wheel;
 a driving unit disposed on the chassis bracket and configured to drive the unmanned vehicle chassis to move;
 a rocker arm connected to the chassis bracket, wherein the rocker arm rotates around an axis of the middle wheel assembly, and the middle wheel assembly and the rear wheel assembly are mounted at both ends of the rocker arm, respectively, and connected to the chassis bracket through the rocker arm, the rocker arm comprises a body with a plate-like structure and a rotating shaft generated by extending horizontally from an inner side of the body, the rotating shaft being positioned on a rocker arm bearing seat of the chassis bracket through a bearing, and the third transmission shaft and the fourth transmission shaft being respectively positioned within the rotating shaft of the rocker arm through a respective duplex bearing; and
 a driving mechanism disposed on the chassis bracket and configured to control the rocker arm to move.

13. The unmanned vehicle according to claim 12, wherein the rotating shaft comprises a hollow rotating shaft.

14. The unmanned vehicle according to claim 13, wherein the front wheel assembly comprises:
 a left front wheel;
 a right front wheel;
 a first transmission shaft engaging the left front wheel; and
 a second transmission shaft engaging the right front wheel.

15. The unmanned vehicle according to claim 14, wherein the driving unit comprises:
 a first motor configured to drive the left front wheel; and
 a second motor configured to drive the right front wheel.

\* \* \* \* \*